US010222673B2

(12) United States Patent
Ke et al.

(10) Patent No.: US 10,222,673 B2
(45) Date of Patent: Mar. 5, 2019

(54) TERMINAL, COLOR CHANGING METHOD, AND COLOR CHANGING APPARATUS

(71) Applicant: Huawei Technologies Co., Ltd., Shenzhen (CN)

(72) Inventors: Youhe Ke, Shenzhen (CN); Liang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/980,436

(22) Filed: Dec. 28, 2015

(65) Prior Publication Data

US 2016/0109779 A1    Apr. 21, 2016

Related U.S. Application Data

(63) Continuation of application No. PCT/CN2014/070722, filed on Jan. 16, 2014.

(30) Foreign Application Priority Data

Jun. 27, 2013    (CN) .......................... 2013 1 0264336

(51) Int. Cl.
  *G02F 1/163*   (2006.01)
  *H04M 1/02*    (2006.01)
  (Continued)

(52) U.S. Cl.
  CPC .............. *G02F 1/163* (2013.01); *G02F 1/155* (2013.01); *H04M 1/0283* (2013.01); *H04M 1/22* (2013.01)

(58) Field of Classification Search
  None
  See application file for complete search history.

(56) References Cited

U.S. PATENT DOCUMENTS 4,973,141 A * 11/1990 Baucke ................. G02F 1/1523
                                                              359/267
5,724,175 A *  3/1998 Hichwa ................. G02F 1/1533
                                                              359/265
(Continued)

FOREIGN PATENT DOCUMENTS

CN           2737119 Y    10/2005
CN         101030161 A     9/2007
(Continued)

OTHER PUBLICATIONS

Doeff et al., "Solid Polyorganodisulfide Electrodes as Ion Storage Layers for ELectrochromic Devices", Jul. 1992.*
(Continued)

*Primary Examiner* — Zhiyu Lu
(74) *Attorney, Agent, or Firm* — Conley Rose, P.C.

(57) ABSTRACT

A terminal, a color changing method, and a color changing apparatus that relate to the field of communications technologies are provided, so as to resolve a technical problem of a waste of materials due to production of a terminal shell. A color changing unit is disposed inside a terminal, where the color changing unit can change a color when receiving electrical energy, and a transparency value of a shell is greater than a first preset transparency value, so that a technical problem of a waste of materials due to production of a terminal shell can be effectively resolved, which can reduce manufacturing materials and is conducive to environmental protection.

16 Claims, 4 Drawing Sheets

(51) Int. Cl.
*H04M 1/22* (2006.01)
*G02F 1/155* (2006.01)

(56) References Cited

U.S. PATENT DOCUMENTS

| | | | | |
|---|---|---|---|---|
| 5,959,762 | A * | 9/1999 | Bandettini | G02B 1/11 348/834 |
| 6,466,299 | B1 * | 10/2002 | Lehtiniemi | H04M 1/0283 349/199 |
| 2002/0021481 | A1 * | 2/2002 | Lin | B60R 25/1004 359/265 |
| 2003/0160741 | A1 * | 8/2003 | Martinez | H04M 1/0283 345/49 |
| 2009/0058353 | A1 * | 3/2009 | Jung | H01M 10/46 320/101 |
| 2009/0231248 | A1 | 9/2009 | Dorff et al. | |
| 2009/0231249 | A1 * | 9/2009 | Wang | G02F 1/19 345/83 |
| 2012/0062713 | A1 * | 3/2012 | Flinsenberg | A47L 9/00 348/61 |
| 2013/0002991 | A1 * | 1/2013 | Latella | H04M 1/0283 349/77 |
| 2013/0157729 | A1 * | 6/2013 | Tabe | H04W 52/0245 455/573 |

FOREIGN PATENT DOCUMENTS

| | | | |
|---|---|---|---|
| CN | 201418093 | Y | 3/2010 |
| CN | 101969503 | A | 2/2011 |
| CN | 102169682 | A | 8/2011 |
| CN | 201957079 | U | 8/2011 |
| CN | 102176728 | A | 9/2011 |
| CN | 103312844 | A | 9/2013 |
| EP | 2779600 | A1 | 9/2014 |
| JP | 2006304112 | A * | 11/2006 ............ H04M 1/00 |
| WO | 2013067774 | A1 | 5/2013 |

OTHER PUBLICATIONS

Cronin et al., "Electrochromic Glazing", Nov. 1998.*
Foreign Communication From A Counterpart Application, European Application No. 14816670.5, Extended European Search Report dated May 16, 2004, 8 pages.
Partial English Translation and Abstract of Chinese Patent Application No. CN102176728, Jan. 6, 2016, 10 pages.
Partial English Translation and Abstract of Chinese Patent Application No. CN101030161, Jan. 6, 2016, 12 pages.
Partial English Translation and Abstract of Chinese Patent Application No. CN102169682, Jan. 6, 2016, 9 pages.
Partial English Translation and Abstract of Chinese Patent Application No. CN2737119, May 11, 2015, 11 pages.
Partial English Translation and Abstract of Chinese Patent Application No. CN101969503, Nov. 5, 2015, 5 pages.
Partial English Translation and Abstract of Chinese Patent Application No. CN103312844, Feb. 18, 2016, 4 pages.
Foreign Communication From A Counterpart Application, PCT Application No. PCT/CN2014/070722, English Translation of International Search Report dated Apr. 3, 2014, 3 pages.
Foreign Communication From A Counterpart Application, PCT Application No. PCT/CN2014/070722, English Translation of Written Opinion dated Apr. 3, 2014, 10 pages.
Foreign Communication From A Counterpart Application, Chinese Application No. 201310264336.4, Chinese Office Action dated Feb. 4, 2015, 8 pages.
Foreign Communication From A Counterpart Application, Chinese Application No. 201310264336.4, Chinese Office Action dated May 28, 2015, 7 pages.

* cited by examiner

TERMINAL, COLOR CHANGING METHOD, AND COLOR CHANGING APPARATUS

CROSS-REFERENCE TO RELATED APPLICATIONS

This application is a continuation of International Application No. PCT/CN2014/070722, filed on Jan. 16, 2014, which claims priority to Chinese Patent Application No. 201310264336.4, filed on Jun. 27, 2013, both of which are hereby incorporated by reference in their entireties.

TECHNICAL FIELD

The present disclosure relates to the field of terminal technologies, and in particular, to a terminal, a color changing method, and a color changing apparatus.

BACKGROUND

With the continuous development of science and technology, electronic technologies have also been developed rapidly, types of electronic products are also increasing, and people have also enjoyed conveniences brought by the development of science and technology. At present, people can enjoy, by using various types of electronic devices, a comfortable life brought by the development of science and technology. For example, an electronic device such as a mobile phone has already become an indispensable part of people's lives. People can strengthen, by using an electronic device such as a mobile phone, contacts with other persons by means of making a call, sending a short message, and the like.

At present, when using electronic devices, users often focus on not only performance of the electronic devices, but also appearance of the electronic devices. For example, when using a mobile phone, a user usually wants to use a relatively beautiful color and a relatively bright-colored shell for his/her own mobile phone. Therefore, in the prior art, to meet consumers' needs, shells of different colors are produced for different mobile phones, for users to select and purchase.

For example, in the prior art, a shell color may be changed by using a traditional process, for example, adding different color masterbatches to a raw shell material, performing surface treatment (such as varnish stoving, electroplating, and anodizing treatment) on a shell, or the like, so that shells of different colors are produced in advance. When a consumer needs a color, physical shell replacement may be performed after a purchase, so as to meet personalized needs of different consumers.

Disadvantages of the prior art are as follows.

To meet user needs, a manufacturer usually produces many shells in batches. However, after using one shell for a period of time, some users may replace the shell. As a result, the original shell may be discarded. Obviously, this causes a waste of materials and increases a yield of rubbish, which is inconducive to environmental protection.

Moreover, when requiring different shell colors, a consumer needs to purchase different shells, which increases purchase costs. In addition, the consumer further needs to replace the shell, and the operation is relatively complex for the consumer.

SUMMARY

Embodiments of the present disclosure provide a terminal, a color changing method, and a color changing apparatus, so as to resolve a technical problem of a waste of materials due to production of a terminal shell in the prior art, thereby achieving a technical effect of reducing manufacturing materials and being conducive to environmental protection.

According to a first aspect of the present disclosure, a terminal is provided, including a shell, where a transparency value of the shell is greater than a first preset transparency value, and the first preset transparency value is a transparency value that enables a user to see a color changing unit located inside the shell; a power supplying unit, disposed inside the shell and configured to supply power to the color changing unit; and the color changing unit, connected to the power supplying unit, attached to an inner side of the shell or attached to an outer side of the shell, and configured to change a color when receiving electrical energy provided by the power supplying unit, where, when receiving a first voltage value from the power supplying unit, the color changing unit adjusts, according to a correspondence between a voltage value and a color, a current color value of the color changing unit as a first color value corresponding to the first voltage value.

With reference to the first aspect, in a first possible implementation manner, the color changing unit is at least one layer of color changing film that implements color changing by means of electrochromism.

With reference to the first possible implementation manner, in a second possible implementation manner, the at least one layer of color changing film includes M layers of first color changing film, where M is a positive integer; or the at least one layer of color changing film includes N layers of second color changing film, where N is a positive integer; or the at least one layer of color changing film includes M layers of first color changing film and N layers of second color changing film, where M is a positive integer and N is an integer not less than 0, or M is an integer not less than 0 and N is a positive integer.

With reference to the second possible implementation manner, in a third possible implementation manner, the first color changing film includes a first transparent conducting layer, a first electrochromic layer, a first ion conductor layer, a first ion storage layer, and a second transparent conducting layer that are stacked in sequence; and the second color changing film includes a third transparent conducting layer, a second electrochromic layer, a second ion conductor layer, a second ion storage layer, and a metal layer that are stacked in sequence.

With reference to the second possible implementation manner or the third possible implementation manner, in a fourth possible implementation manner, a color of the metal layer is a second color, and the second color is the same as or different from the first color.

With reference to the first aspect or any one of the first to fourth possible implementation manners, in a fifth possible implementation manner, the shell includes a top-layer shell and a bottom-layer shell that is disposed opposite to the top-layer shell; and the color changing unit is attached to an inner side of the top-layer shell, or the color changing unit is attached to an outer side of the top-layer shell, or the color changing unit is attached to an inner side of the bottom-layer shell, or the color changing unit is attached to an outer side of the bottom-layer shell, or the color changing unit is attached to an inner side of the top-layer shell and an inner side of the bottom-layer shell, or the color changing unit is attached to an outer side of the top-layer shell and an outer side of the bottom-layer shell, or the color changing unit is attached to an inner side of the top-layer shell and an outer side of the bottom-layer shell, or the color changing unit is attached to an outer side of the top-layer shell and an inner side of the bottom-layer shell.

With reference to the fifth possible implementation manner, in a sixth possible implementation manner, the terminal further includes a displaying unit, disposed inside the top-layer shell of the shell and configured to display local data or data acquired from another electronic device.

With reference to the first aspect or any one of the first to sixth possible implementation manners, in a seventh possible implementation manner, the terminal further includes a processor located inside the shell, where the processor is connected to the power supplying unit; and the processor is configured to receive selection information of the user and determine, according to the selection information, that the user selects the first color, a color value of the first color is the first color value.

With reference to the first aspect or any one of the first to sixth possible implementation manners, in an eighth possible implementation manner, the terminal further includes a processor located inside the shell, where the processor is connected to the power supplying unit; and the processor is configured to obtain a first environment color, where the first environment color is a color of a surrounding environment of the terminal; and match the first environment color with a stored color, and determine the first color whose degree of color matching with the first environment color is within a first preset threshold, a color value of the first color is the first color value, where the first preset threshold is used to indicate that the first environment color and the first color are adjacent colors or similar colors.

According to a second aspect of the present disclosure, a color changing method is provided, where the method is applied to a terminal, where the terminal includes a shell and a color changing unit that is attached to an inner side of the shell or attached to an outer side of the shell; and the method includes the following steps: obtaining a first color value; determining, according to a correspondence set of a color value and a voltage value, a first voltage value corresponding to the first color value; and providing the first voltage value for the color changing unit, such that a color value of the color changing unit is changed from an initial color value to the first color value.

With reference to the second aspect, in a first possible implementation manner, the step of obtaining a first color value includes receiving selection information of a user; and determining, according to the selection information, that the user selects a first color, a color value of the first color is the first color value.

With reference to the second aspect, in a second possible implementation manner, the step of obtaining a first color value includes obtaining a first environment color, where the first environment color is a color of a surrounding environment of the terminal; and matching the first environment color with a stored color, and determining a first color whose degree of color matching with the first environment color is within a first preset threshold, a color value of the first color is the first color value, where the first preset threshold is used to indicate that the first environment color and the first color are adjacent colors or similar colors.

According to a third aspect of the present disclosure, a color changing apparatus is provided, where the color changing apparatus includes a shell and a color changing unit that is attached to an inner side of the shell or attached to an outer side of the shell; and the color changing apparatus further includes a processor configured to obtain a first color value, and determine, according to a correspondence set of a color value and a voltage value, a first voltage value corresponding to the first color value; and a power supplying unit configured to provide the first voltage value for the color changing unit according to an instruction of the processor, where the color changing unit is configured to, when receiving the first voltage value, adjust a current color value of the color changing unit as the first color value corresponding to the first voltage value.

With reference to the third aspect, in a first possible implementation manner, that a processor is configured to obtain a first color value includes receiving selection information of a user; and determining, according to the selection information, that the user selects a first color, a color value of the first color is the first color value.

With reference to the third aspect, in a second possible implementation manner, that a processor is configured to obtain a first color value includes obtaining a first environment color, where the first environment color is a color of a surrounding environment of the terminal; and matching the first environment color with a stored color, and determining a first color whose degree of color matching with the first environment color is within a first preset threshold, a color value of the first color is the first color value, where the first preset threshold is used to indicate that the first environment color and the first color are adjacent colors or similar colors.

The terminal in the embodiments of the present disclosure may include a shell, where a transparency value of the shell is greater than a first preset transparency value, and the first preset transparency value is a transparency value that enables a user to see a color changing unit located inside the shell; a power supplying unit, disposed inside the shell and configured to supply power to the color changing unit; and the color changing unit, connected to the power supplying unit, attached to an inner side of the shell or attached to an outer side of the shell, and configured to change a color when receiving electrical energy provided by the power supplying unit, where when receiving a first voltage value from the power supplying unit, the color changing unit adjusts, according to a correspondence between a voltage value and a color, a current color value of the color changing unit as a first color corresponding to the first voltage value.

In the embodiments of the present disclosure, the terminal may include the color changing unit. The color changing unit itself can change a color according to different voltage values that are received. The transparency value of the shell is greater than the first preset transparency value. Therefore, the color changing unit is attached to the inner side of the shell or the outer side of the shell, and when the color changing unit changes the color, a color of the shell is also changed accordingly. In this way, a color of the terminal can be changed without a need of adding an additional hardware shell to the terminal, which can effectively resolve a technical problem of a waste of materials due to production of a terminal shell in the prior art, can reduce manufacturing materials, and is conducive to environmental protection. For a user, a color of a terminal used by the user can be changed without a need of adding another hardware shell, which can not only implement personalization, but also reduce purchase costs of the user. In addition, the user does not need to manually replace a shell of the terminal, which also brings a great convenience to the user.

DESCRIPTION OF EMBODIMENTS

Figure 1:
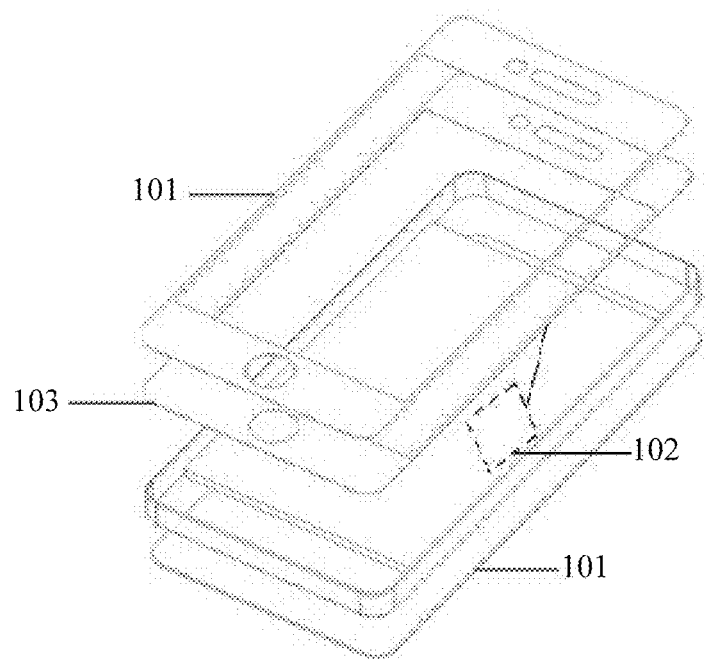
FIG. 1 is a main schematic structural diagram of a terminal according to an embodiment of the present disclosure.

The terminal in the embodiments of the present disclosure may include a shell, where a transparency value of the shell is greater than a first preset transparency value, and the first preset transparency value is a transparency value that enables a user to see a color changing unit located inside the shell; a power supplying unit, disposed inside the shell and configured to supply power to the color changing unit; and the color changing unit, connected to the power supplying unit, attached to an inner side of the shell or attached to an outer side of the shell, and configured to change a color when receiving electrical energy provided by the power supplying unit, where when receiving a first voltage value from the power supplying unit, the color changing unit adjusts, according to a correspondence between a voltage value and a color, a current color value of the color changing unit as a first color corresponding to the first voltage value.

In the embodiments of the present disclosure, the terminal may include the color changing unit. The color changing unit itself can change a color according to different voltage values that are received. The transparency value of the shell is greater than the first preset transparency value. Therefore, the color changing unit is attached to the inner side of the shell or the outer side of the shell, and when the color changing unit changes the color, a color of the shell is also changed accordingly. In this way, a color of the terminal can be changed without a need of adding an additional hardware shell to the terminal, which can effectively resolve a technical problem of a waste of materials due to production of a terminal shell in the prior art, can reduce manufacturing materials, and is conducive to environmental protection. For a user, a color of a terminal used by the user can be changed without a need of adding another hardware shell, which can not only implement personalization, but also reduce purchase costs of the user. In addition, the user does not need to manually replace a shell of the terminal, which also brings a great convenience to the user.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

A terminal may be a large-sized terminal or a small-sized terminal, and may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the RAN. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

In addition, the term "and/or" in this specification describes only an association relationship for describing associated objects and represents that three relationships may exist. For example, A and/or B may represent the following three cases: Only A exists, both A and B exist, and only B exists. In addition, the symbol "/" in this specification generally represents that associated objects before and after the symbol are in an "or" relationship.

The following describes exemplary implementation manners of the present disclosure in detail with reference to the accompanying drawings.

Embodiment 1

Referring to FIG. 1, this embodiment of the present disclosure provides a terminal, where the terminal may include a shell 101, a power supplying unit 102, and a color changing unit 103.

A mobile phone is used as an example of the terminal in FIG. 1. In FIG. 1, the power supplying unit 102 is presented using a dashed line because the power supplying unit 102 should be located inside a main body of the terminal and should be invisible. However, for clear description of the present disclosure, the power supplying unit 102 needs to be presented. Therefore, in FIG. 1, the power supplying unit 102 is schematically shown using a dashed line and the power supplying unit 102 is connected to the color changing unit 103.

A transparency value of the shell 101 may be greater than a first preset transparency value, that is, the shell 101 has certain transparency. In this embodiment of the present disclosure, the first preset transparency value may be a transparency value that enables a user to see the color changing unit 103 located inside the shell 101.

For example, if the terminal is a mobile phone, the shell 101 is a housing of the mobile phone; if the terminal is a PAD (tablet computer), the shell 101 is a housing of the PAD, and so on.

The power supplying unit 102 may be disposed inside the shell 101 and may be configured to supply power to the color changing unit 103.

In this embodiment of the present disclosure, the power supplying unit 102 may supply power to both the terminal and the color changing unit 103. Alternatively, in this embodiment of the present disclosure, the power supplying unit 102 may also supply power to only the color changing unit 103.

If the power supplying unit 102 supplies power to only the color changing unit 103, if the terminal can work only after power is supplied, one power supplying device should be further available in the terminal for supplying power to the terminal, such that the terminal can work normally.

In this embodiment of the present disclosure, the power supplying unit 102 may be, for example, a battery, or may be another functional unit that can provide electrical energy.

The color changing unit 103 may be connected to the power supplying unit 102. The power supplying unit 102 may provide electrical energy for the color changing unit 103. The color changing unit 103 may be configured to change a color when receiving the electrical energy provided by the power supplying unit 102.

Figure 2A:
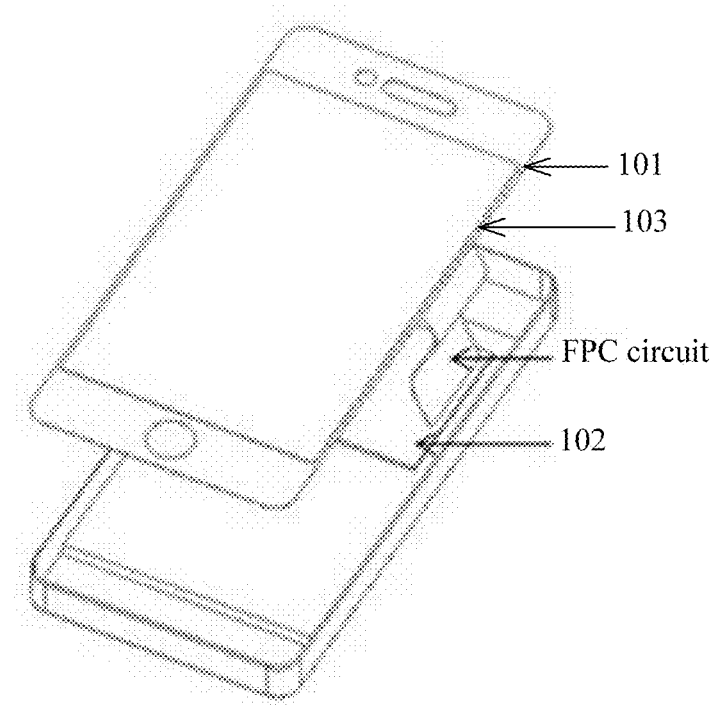
FIG. 2A is a schematic diagram of a connection manner of a power supplying unit and a color changing unit according to an embodiment of the present disclosure.

Optionally, referring to FIG. 2A, in this embodiment of the present disclosure, the power supplying unit 102 may supply power to the color changing unit 103 through a flexible printed circuit (FPC) circuit.

In this embodiment of the present disclosure, the shell 101 may be further divided into a top-layer shell and a bottom-layer shell that is disposed opposite to the top-layer shell. For example, if the terminal is a mobile phone, the top-layer shell may be a front cover of the mobile phone and the bottom-layer shell may be a rear cover of the mobile phone. Such a form is used an example for schematic description in FIG. 1.

In FIG. 2A, that the color changing unit 103 is attached to the top-layer shell is used as an example for description.

Figure 2B:
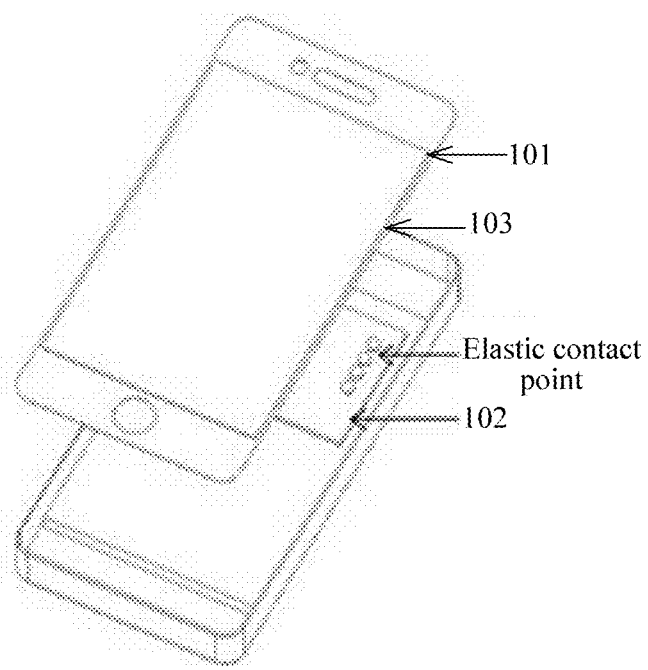
FIG. 2B is a schematic diagram of another connection manner of a power supplying unit and a color changing unit according to an embodiment of the present disclosure.

Optionally, referring to FIG. 2B, in this embodiment of the present disclosure, the power supplying unit 102 may supply power to the color changing unit 103 through elastic contacts.

In FIG. 2B, that the color changing unit 103 is attached to the top-layer shell is used as an example for description. It can be seen from FIG. 2B that when the top-layer shell covers the main body of the terminal, the color changing unit 103 is connected to the power supplying unit 102 through the elastic contacts.

The color changing unit 103 may be attached to an inner side of the shell 101, or the color changing unit 103 may be attached to an outer side of the shell 101.

In this embodiment of the present disclosure, the terminal may further include a displaying unit. The displaying unit may be disposed inside the top-layer shell of the shell 101. The displaying unit may be configured to display local data, or may be configured to display data acquired from another electronic device.

In this embodiment of the present disclosure, that the color changing unit 103 may be attached to an inner side of the shell 101 means that the color changing unit 103 may be attached to an inner side of the top-layer shell, or that the color changing unit 103 may be attached to an inner side of the bottom-layer shell, or that the color changing unit 103 may be attached to an inner side of the top-layer shell and an inner side of the bottom-layer shell.

Likewise, in this embodiment of the present disclosure, that the color changing unit 103 may be attached to an outer side of the shell 101 means that the color changing unit 103 may be attached to an outer side of the top-layer shell, or that the color changing unit 103 may be attached to an outer side of the bottom-layer shell, or that the color changing unit 103 may be attached to an outer side of the top-layer shell and an outer side of the bottom-layer shell.

In this embodiment of the present disclosure, because the shell 101 may be divided into the top-layer shell and the bottom-layer shell, the color changing unit 103 may be attached in multiple manners.

Optionally, the color changing unit 103 may be attached to only the inner side of the top-layer shell.

Optionally, the color changing unit 103 may be attached to only the outer side of the top-layer shell.

Optionally, the color changing unit 103 may be attached to only the inner side of the bottom-layer shell.

Optionally, the color changing unit 103 may be attached to only the outer side of the bottom-layer shell.

Optionally, the color changing unit 103 may be attached to the inner side of the top-layer shell and the inner side of the bottom-layer shell.

Optionally, the color changing unit 103 may be attached to the outer side of the top-layer shell and the outer side of the bottom-layer shell.

Optionally, the color changing unit 103 may be attached to the inner side of the top-layer shell and the outer side of the bottom-layer shell.

Optionally, the color changing unit 103 may be attached to the outer side of the top-layer shell and the inner side of the bottom-layer shell.

Alternatively, there may also be another attaching manner, for example, the color changing unit 103 may be attached to both the inner side of the top-layer shell and the outer side of the top-layer shell, or the color changing unit 103 may be attached to both the inner side of the bottom-layer shell and the inner side of the bottom-layer shell, or the like, to cause an effect of color mixture. Any manner of attaching the color changing unit 103 without departing from the idea of the present disclosure shall fall within the protection scope of the present disclosure.

Preferably, in another embodiment of the present disclosure, there are multiple manners of attaching the color changing unit 103 to the inner side of the shell 101 or the outer side of the shell 101. For example, the color changing unit 103 may completely cover the shell 101, or the color changing unit 103 may be attached to only some positions on the shell 101.

For example, an area of the top-layer shell is a first area. If the color changing unit 103 is attached to the inner side of the top-layer shell, an area occupied by the color changing unit 103 on the top-layer shell may be a first subarea, where the first subarea may be equal to the first area, or the first subarea may be less than the first area.

For example, the color changing unit 103 may be attached to only a peripheral of the top-layer shell, which may cause a phenomenon that a color change occurs at a perimeter of the top-layer shell; or the color changing unit 103 may be attached to only a middle position of the top-layer shell, which may cause a phenomenon that a color change occurs in the middle of the top-layer shell.

Preferably, in this embodiment of the present disclosure, if the color changing unit 103 is attached to the inner side or the outer side of the top-layer shell, when being attached, the color changing unit 103 may be attached, away from the displaying unit of the terminal, that is, it may be maintained that the color changing unit 103 does not overlap with the displaying unit, which can avoid affecting a normal displaying effect of the displaying unit due to a color change by the color changing unit 103.

A same idea is also followed for attaching the color changing unit 103 to the outer side of the top-layer shell, the inner side of the bottom-layer shell, or the outer side of the bottom-layer shell.

In a word, an area and an attaching position of the color changing unit 103 may be designed according to actual needs, which can be more conducive to personalized design, and can further improve user experience.

Preferably, in another embodiment of the present disclosure, if the color changing unit 103 is attached to the inner side of the shell 101, the transparency value of the shell 101 may be greater than a second preset transparency value, where the first preset transparency value may be a transparency value that enables a user to see the color changing unit 103 located inside the shell 101. Preferably, the second preset transparency value may be greater than the first preset transparency value.

That is, if the color changing unit 103 is attached to the inner side of the shell 101, a transparency requirement for the shell 101 is higher, and therefore the transparency value of the shell 101 may be greater than the second preset transparency value. However, if the color changing unit 103 is attached to the outer side of the shell 101, the transparency requirement for the shell 101 is lower, and therefore the transparency value of the shell 101 may be greater than the first preset transparency value.

For example, if the color changing unit 103 is attached to only the inner side of the top-layer shell, a transparency value of the top-layer shell may be greater than the second preset transparency value. In this case, a transparency value of the bottom-layer shell does not need to be considered.

That is, if the color changing unit 103 is attached to only the inner side or the outer side of the top-layer shell, the transparency value of the bottom-layer shell does not need to be considered. If the color changing unit 103 is attached to only the inner side or the outer side of the bottom-layer shell, the transparency value of the top-layer shell does not need to be considered.

For example, if the color changing unit 103 is attached to the outer side of the top-layer shell and the outer side of the bottom-layer shell, both the transparency value of the top-layer shell and the transparency value of the bottom-layer shell may be greater than the first preset transparency value.

For example, if the color changing unit 103 is attached to the inner side of the top-layer shell and the inner side of the bottom-layer shell, both the transparency value of the top-layer shell and the transparency value of the bottom-layer shell may be greater than the second preset transparency value.

For example, if the color changing unit 103 is attached to the outer side of the top-layer shell and the inner side of the bottom-layer shell, the transparency value of the top-layer shell may be greater than the first preset transparency value, and the transparency value of the bottom-layer shell may be greater than the second preset transparency value.

That is, when the shell 101 is manufactured, the transparency values of the top-layer shell and the bottom-layer shell may be determined according to different cases.

In this embodiment of the present disclosure, when receiving a first voltage value from the power supplying unit 102, the color changing unit 103 may adjust, according to a correspondence between a voltage value and a color, a current color value of the color changing unit 103 as a first color value corresponding to the first voltage value.

Preferably, in another embodiment of the present disclosure, the color changing unit 103 may be at least one layer of color changing film that implements color changing by means of electrochromism.

In this embodiment of the present disclosure, the color changing film may be different color changing film. For example, the color changing film may include at least first color changing film and second color changing film, where structures of the first color changing film and the second color changing film may be different.

In this embodiment of the present disclosure, the color changing unit 103 may be the at least one layer of color changing film, where the at least one layer of color changing film may include M layers of the first color changing film, where M is a positive integer; or the at least one layer of color changing film may include N layers of the second color changing film, where N is a positive integer; or the at least one layer of color changing film may include M layers of the first color changing film and N layers of the second color changing film, where M is a positive integer and N is an integer not less than 0, or M is an integer not less than 0 and N is a positive integer. That is, it needs to be ensured that the color changing unit 103 is formed by at least one layer of color changing film.

Electrochromism refers to a phenomenon that a stable reversible color change occurs on optical attributes (such as reflectivity, transmittance, and an absorption rate) of a material under an applied electric field, and is represented as a reversible color and transparency change in appearance. A material having electrochromism performance is called an electrochromic material. A main principle of the electrochromism is that an electrochromic material undergoes an electrochemical redox reaction under an applied electric field, leading to electron gain or loss, thereby causing a color change to the material.

Optionally, in this embodiment of the present disclosure, the first color changing film may include a first transparent conducting layer, a first electrochromic layer, a first ion conductor layer, a first ion storage layer, and a second transparent conducting layer.

Figure 3:
FIG. 3 is a schematic structural diagram of first color changing film according to an embodiment of the present disclosure.

Referring to FIG. 3, FIG. 3 is a possible schematic structural diagram of the first color changing film. In FIG. 3, 301 indicates the first transparent conducting layer, 302 indicates the first electrochromic layer, 303 indicates the first ion conductor layer, 304 indicates the first ion storage layer, and 305 indicates the second transparent conducting layer.

It can be seen from FIG. 3 that the first color changing film includes the first transparent conducting layer 301, the first electrochromic layer 302, the first ion conductor layer 303, the first ion storage layer 304, and the second transparent conducting layer 305 that are stacked in sequence.

It can be seen from FIG. 3 that, in the first color changing film, one side of the first electrochromic layer 302 is attached to one side of the first transparent conducting layer 301, another side of the first electrochromic layer 302 is attached to one side of the first ion conductor layer 303, another side of the first ion conductor layer 303 is attached to one side of the first ion storage layer 304, and another side of the first ion storage layer 304 is attached to one side of the second transparent conducting layer 305.

In this embodiment of the present disclosure, one protection layer may be further provided on another side of the first transparent conducting layer 301 and/or on another side of the second transparent conducting layer 305, and is used to protect the first color changing film.

When the first color changing film is attached to the inner side of the shell 101 or the outer side of the shell 101, a direction of the first color changing film may be arbitrary. For example, when the first color changing film is attached to the outer side of the shell 101, it may be that the second transparent conducting layer 305 of the first color changing film is located on one side close to the shell 101, and the first transparent conducting layer 301 of the first color changing film is located on one side far away from the shell 101, or it may be that the second transparent conducting layer 305 of the first color changing film is located on one side far away from the shell 101, and the first transparent conducting layer 301 of the first color changing film is located on one side close to the shell 101. The attaching direction of the first color changing film does not affect a color changing effect of the first color changing film.

A working principle of the first color changing film is: after a forward direct current voltage is added on the first transparent conducting layer 301, an ion in the first ion storage layer 304 is extracted and enters the first electrochromic layer 302 through the first ion conductor layer 303, and then a redox reaction occurs in the first electrochromic layer 302, thereby causing a color change to the first electrochromic layer 302, which generally becomes colored from original colorlessness. However, if a backward direct current voltage is added on the first transparent conducting layer 301, an ion in the first electrochromic layer 302 re-enters the first ion storage layer 304 after being extracted, and the first color changing film recovers to an original transparent state.

Optionally, in this embodiment of the present disclosure, the second color changing film may include a third transparent conducting layer, a second electrochromic layer, a second ion conductor layer, a second ion storage layer, and a metal layer.

Figure 4:
FIG. 4 is a schematic structural diagram of second color changing film according to an embodiment of the present disclosure.

Referring to FIG. 4, FIG. 4 is a possible schematic structural diagram of the second color changing film. In FIG. 4, 401 indicates the third transparent conducting layer, 402 indicates the second electrochromic layer, 403 indicates the second ion conductor layer, 404 indicates the second ion storage layer, and 405 indicates the metal layer.

It can be seen from FIG. 4 that the second color changing film includes the third transparent conducting layer 401, the second electrochromic layer 402, the second ion conductor layer 403, the second ion storage layer 404, and the metal layer 405 that are stacked in sequence.

It can be seen from FIG. 4 that, in the second color changing film, one side of the second electrochromic layer 402 is attached to one side of the third transparent conducting layer 401, another side of the second electrochromic layer 402 is attached to one side of the second ion conductor layer 403, another side of the second ion conductor layer 403 is attached to one side of the second ion storage layer 404, and another side of the second ion storage layer 404 is attached to one side of the metal layer 405.

In this embodiment of the present disclosure, one protection layer may be further provided on another side of the third transparent conducting layer 401 and/or on another side of the metal layer 405, and is used to protect the second color changing film.

When the second color changing film is attached to the inner side of the shell 101 or the outer side of the shell 101, a direction of the second color changing film may be arbitrary. For example, when the second color changing film is attached to the outer side of the shell 101, it may be that the metal layer 405 of the second color changing film is located on one side close to the shell 101, and the third transparent conducting layer 401 of the second color changing film is located on one side far away from the shell 101, or it may be that the metal layer 405 of the second color changing film is located on one side far away from the shell 101, and the third transparent conducting layer 401 of the second color changing film is located on one side close to the shell 101. The attaching direction of the second color changing film does not affect a color changing effect of the second color changing film.

It can be seen from FIG. 3 and FIG. 4 that a difference between the first color changing film and the second color changing film lies in that one transparent conducting layer in the second color changing film is replaced with the metal layer. The metal layer itself may have a color. That is, the metal layer 405 may have a color no matter whether the second color changing film receives a voltage provided by the power supplying unit 102. For example, the metal layer 405 may be set as a color such as yellow or blue according to needs. A specific color varies with metal forming the metal layer 405.

A working principle of the second color changing film is: after a forward direct current voltage is added on the third transparent conducting layer 401, an ion in the second ion storage layer 404 is extracted and enters the second electrochromic layer 402 through the second ion conductor layer 403, and then a redox reaction occurs in the second electrochromic layer 402, thereby causing a color change to the second electrochromic layer 402. Generally, the second electrochromic layer 402 becomes colored from original colorlessness. However, if a backward direct current voltage is added on the third transparent conducting layer 401, an ion in the second electrochromic layer 402 re-enters the second ion storage layer 404 after being extracted, and the second electrochromic layer 402 recovers to an original transparent state.

When the color of the second electrochromic layer 402 changes, the color of the second electrochromic layer 402 and an original color of the metal layer 405 are mixed, such that a color presented for the second color changing film is an effect after color mixture.

For example, if the original color of the metal layer 405 is yellow and the color of the second electrochromic layer 402 changes from colorlessness to blue, when the second color changing film does not receive the first voltage value provided by the power supplying unit 102, the second color changing film is presented as yellow; or when the second color changing film receives the first voltage value provided by the power supplying unit 102, the second color changing film is presented as green, namely a color obtained after yellow and blue are mixed.

In this way, more different colors can be obtained by means of color mixture, which increases color diversity and obtains a richer displaying effect.

In this embodiment of the present disclosure, if the color changing unit 103 includes only one layer of the first color changing film, when the color changing unit 103 receives the first voltage value provided by the power supplying unit 102 and changes the color, a color presented for the shell 101 is a color obtained after the first color changing film changes a color.

In this embodiment of the present disclosure, if the color changing unit 103 includes only one layer of the second color changing film, when the color changing unit 103 receives the first voltage value provided by the power supplying unit 102 and changes the color, a color presented for the shell 101 is a color obtained after the second color changing film changes a color. A color finally presented for the second color changing film is also an effect of color mixture of the second electrochromic layer 402 and the metal layer 405.

In this embodiment of the present disclosure, if the color changing unit 103 includes at least one layer of the first color changing film and at least one layer of the second color changing film, when the color changing unit 103 receives the first voltage value provided by the power supplying unit 102 and changes the color, a color presented for the shell 101 is a color obtained by means of color mixture after the at least one layer of the first color changing film and the at least one layer of the second color changing film change colors.

For example, if the color changing unit 103 includes one layer of the first color changing film and one layer of the second color changing film, for example, the first color changing film changes from colorlessness to blue when obtaining the first voltage value, the second color changing film changes from colorlessness to black when obtaining the first voltage value, and the metal layer 405 itself of the second color changing film is yellow. Therefore, when the color changing unit 103 receives the first voltage value provided by the power supplying unit 102 and changes the color, a color presented for the shell 101 is a color obtained by means of color mixture after the at least one layer of the first color changing film and the at least one layer of the second color changing film change colors. For example, the shell 101 is presented as green because deep yellow is presented by mixing yellow and black in the second color changing film, and green is presented by mixing deep yellow and blue of the first color changing film.

In this embodiment of the present disclosure, regardless of the first color changing film or the second color changing film, when different voltage values are received by the first color changing film or the second color changing film, finally presented colors are also different.

For example, for the first color changing film, when different voltage values are received, the first electrochromic layer 302 turns to different colors. A reason is that when different voltage values are received by the first color changing film, quantities of ions entering the first electrochromic layer 302 from the first ion storage layer 304 are different, and therefore degrees and scopes of the redox reaction occurring in the first electrochromic layer 302 are also different, such that the colors presented for the first electrochromic layer 302 are naturally different.

Likewise, for the second color changing film, when different voltage values are received, the second electrochromic layer 402 turns to different colors. A reason is that when the voltage values received by the second color changing film are different, quantities of ions entering the second electrochromic layer 402 from the second ion storage layer 404 are different, and therefore degrees and scopes of the redox reaction occurring in the second electrochromic layer 402 are also different, such that the colors presented for the second electrochromic layer 402 are naturally different and the effects after color mixture of the second electrochromic layer 402 and the metal layer 405 are also naturally different.

Figure 5:
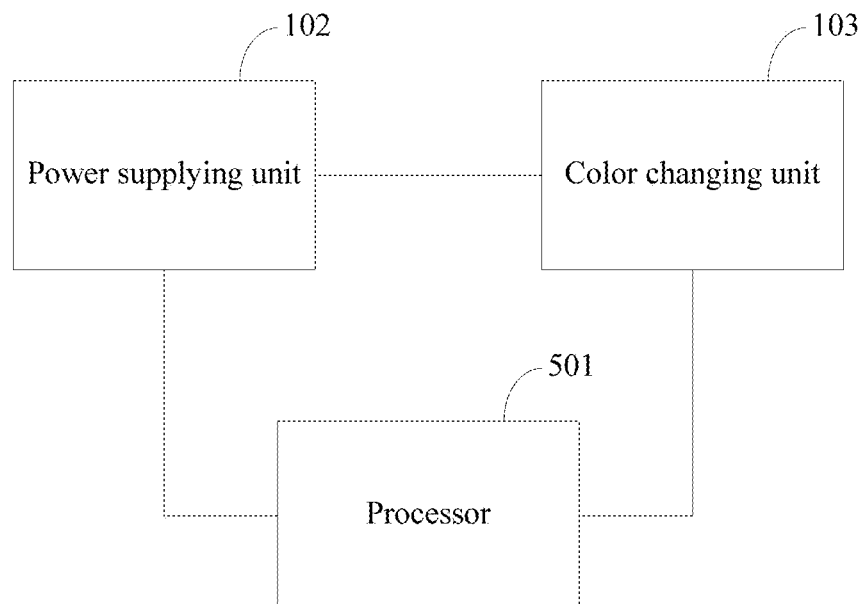
FIG. 5 is a detailed structural diagram of a terminal according to an embodiment of the present disclosure.

Referring to FIG. 5, in another embodiment of the present disclosure, the terminal may further include a processor 501.

The processor 501 may be located inside the shell 101. The processor 501 may be connected to the power supplying unit 102.

Optionally, in this embodiment of the present disclosure, the processor 501 may be configured to receive selection information of the user; and determine, according to the selection information, that the user selects a first color, a color value of the first color is the first color value.

Optionally, in this embodiment of the present disclosure, the processor 501 may be configured to obtain a first environment color, where the first environment color is a color of a surrounding environment of the terminal, and match the first environment color with a stored color, and determine a first color whose degree of color matching with the first environment color is within a first preset threshold, a color value of the first color is the first color value, where the first preset threshold may be used to indicate that the first environment color and the first color are adjacent colors or similar colors.

The similar colors refer to colors that have a same hue property but different shades. The similar colors are colors whose included angle in a hue circle is within a range of 15 degrees (°). For example, bright red and vermilion are similar colors.

A color is randomly selected on a 24-color hue circle, for example, a second color is selected, and a color separated from the second color by 90 degrees is called, for example, a third color. The second color and the third color are adjacent colors. Alternatively, a color is randomly selected on a 24-color hue circle, for example, a second color is selected, and a color separated from the second color by five or six digit positions is called, for example, a third color. The second color and the third color are adjacent colors. For example, red and yellowish orange are adjacent colors, blue and yellowish green are adjacent colors, and the like.

In this embodiment of the present disclosure, if the first environment color and the first color are similar colors or adjacent colors, the first environment color and the first color are visually harmonious, and an effect of trying to make an appearance color of the electronic device be integrated with an environment in this embodiment of the present disclosure can also be achieved.

Embodiment 2

Figure 6:
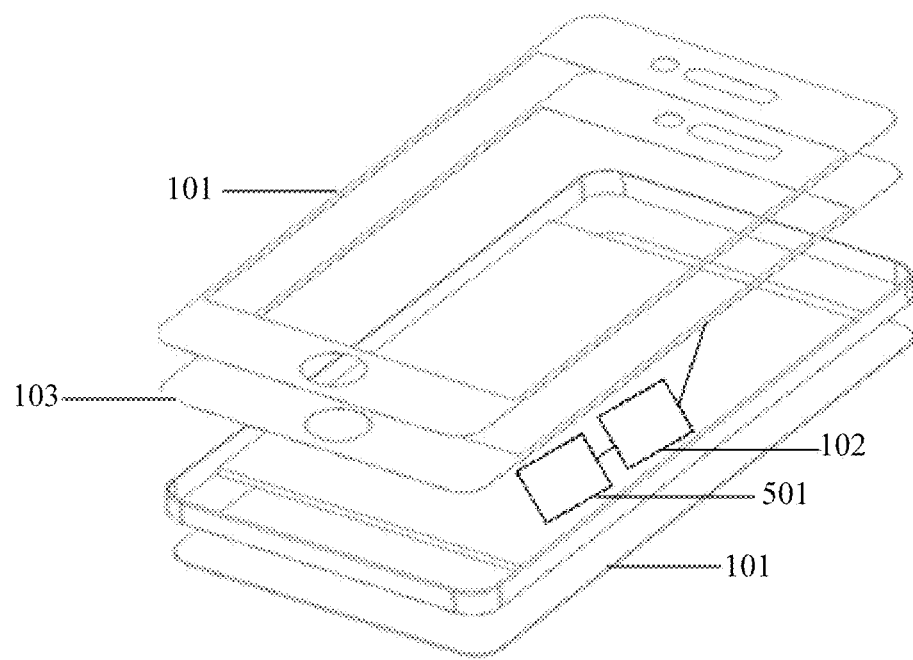
FIG. 6 is a main structural diagram of a color changing apparatus according to an embodiment of the present disclosure.

Referring to FIG. 6, this embodiment of the present disclosure provides a color changing apparatus. The color changing apparatus may include a shell 101 and a color changing unit 103 that is attached to an inner side of the shell 101 or attached to an outer side of the shell 101. In this embodiment of the present disclosure, the color changing apparatus may further include a processor 501, a power supplying unit 102, and the color changing unit 103. Preferably, the color changing apparatus described in Embodiment 2 and the terminal described in Embodiment 1 may be a same device.

In FIG. 6, both the power supplying unit 102 and the processor 501 are presented using a dashed line because the power supplying unit 102 and the processor 501 should be located inside a main body of the terminal and should be invisible. However, for clear description of the present disclosure, the power supplying unit 102 and the processor 501 need to be presented. Therefore, in FIG. 1, the power supplying unit 102 and the processor 501 are schematically shown using a dashed line, and the power supplying unit 102 is connected to the color changing unit 103 and the processor 501 is connected to the power supplying unit 102.

It can be seen that, in FIG. 6, a shape of the color changing apparatus is similar to a shape of the terminal in Embodiment 1, that is, FIG. 6 describes the color changing apparatus using the shape of the terminal as an example, which further indicates that the color changing apparatus and the terminal may be a same device.

The processor 501 may be configured to obtain a first color value, and determine, according to a correspondence set of a color value and a voltage value, a first voltage value corresponding to the first color value.

In this embodiment of the present disclosure, manners used by the processor 501 to obtain the first color value may be different.

Optionally, that the processor 501 obtains a first color value may be: receiving, by the processor 501, selection information of a user, and determining, according to the selection information, that the user selects a first color, a color value of the first color is the first color value.

Further, it may be that the processor 501 obtains a first operation performed by the user, may respond to the first operation after obtaining the first operation and determine selection information corresponding to the first operation, and may determine, according to the selection information, that a color selected through the first operation performed by the user is the first color and that the color value of the first color is the first color value.

For example, the processor 501 may generate a selection interface. The selection interface may include at least one type of selectable color information. The color changing apparatus may include a displaying unit. The processor 501 may instruct the displaying unit to display the selection interface, such that the user can select a wanted color on the selection interface after seeing the selection interface. For example, if the user selects the first color, a color finally presented by the color changing unit 103 is the first color.

The processor 501 may pre-store the correspondence set of the color value and the voltage value. After obtaining the first operation, the processor 501 may determine the selection information according to the first operation, thereby determining the first color selected according to the selection information and that the color value of the first color is the first color value. Therefore, the processor 501 may search for the first color value in the correspondence set. After the first color value is found, a voltage value corresponding to the first color value is also queried accordingly. For example, if the voltage value corresponding to the first color value is the first voltage value, the processor 501 may send a first instruction to the power supplying unit 102, where the first instruction may be used to instruct the power supplying unit 102 to provide the first voltage value for the color changing unit 103.

Optionally, in this embodiment of the present disclosure, that the processor 501 obtains a first color value may be: obtaining a first environment color, where the first environment color is a color of a surrounding environment of the terminal; and matching the first environment color with a stored color, and determining a first color whose degree of color matching with the first environment color is within a first preset threshold, a color value of the first color is the first color value, where the first preset threshold is used to indicate that the first environment color and the first color are adjacent colors or similar colors.

For example, the apparatus may have a detecting unit. The detecting unit may be configured to acquire the first environment color by means of detection. For example, the detecting unit may be a sensor. After the detecting unit acquires the first environment color, the processor 501 may acquire the first environment color using the detecting unit. The electronic device may internally store multiple colors. For example, the electronic device may have a storing unit that is configured to store multiple colors. After acquiring the first environment color, the processor 501 may match the first environment color with each stored color. The processor 501 may determine one color whose degree of color matching with the first environment color is within the first preset threshold. For example, the color is the first color.

In this embodiment of the present disclosure, when the processor 501 matches the first environment color and the stored color, multiple colors whose degree of color matching with the first environment color is within the first preset threshold may be matched. For example, if it is found that a color matching degree of a second color and the first environment color is within the first preset threshold and that a color matching degree of a third color and the first environment color is within the first preset threshold, a first distance between the second color and the first environment color, and a first distance between the third color and the first environment color may be determined on a hue circle, and a color with a smaller distance from the first environment color is selected as the first color.

For example, if it is determined that the first distance is less than the second distance, it may be determined that the second color is the first color and the color value of the first color is the first color value.

The processor 501 may pre-store the correspondence set of the color value and the voltage value. After obtaining the first color value, the processor 501 may search for the first color value in the correspondence set. After the first color value is found, a voltage value corresponding to the first color value is also queried accordingly. For example, if the voltage value corresponding to the first color value is the first voltage value, the processor 501 may send a first instruction to the power supplying unit 102, where the first instruction may be used to instruct the power supplying unit 102 to provide the first voltage value for the color changing unit 103.

The power supplying unit 102 may be configured to provide the first voltage value for the color changing unit 103 according to the instruction of the processor 501.

The color changing unit 103 may be configured to, when receiving the first voltage value, adjust a current color value of the color changing unit 103 as the first color value corresponding to the first voltage value.

In this embodiment of the present disclosure, only one voltage value may be provided for the color changing unit 103, regardless of a quantity of layers of color changing film included in the color changing unit 103. That is, the color changing unit 103 is used as a whole, and voltage values received by all layers of color changing film are the same, regardless of the quantity of layers of color changing film included in the color changing unit 103.

In this case, when the electronic device presets the correspondence set of the color value and the voltage value, a correspondence between a color value finally presented by the color changing unit 103 and a voltage value provided for the color changing unit 103 is set. Therefore, if the color changing unit 103 includes multiple layers of color changing film, when the correspondence set is set, a color value that is considered is a color value obtained after color mixture.

The power supplying unit 102 in Embodiment 1 may be equivalent to the power supplying unit 102 in Embodiment 2. The color changing unit 103 in Embodiment 1 may be equivalent to the color changing unit 103 in Embodiment 2. The processor 501 in Embodiment 2 may be equivalent to the processor 501 in Embodiment 1. The displaying unit described in Embodiment 1 may be equivalent to the displaying unit described in Embodiment 2.

Embodiment 3

Figure 7:
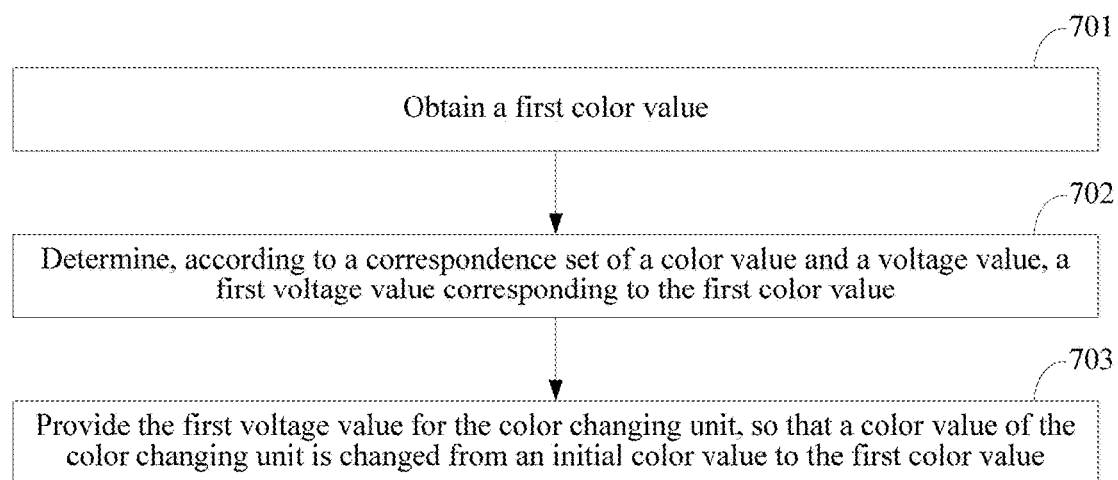
FIG. 7 is a main flowchart of a color changing method according to an embodiment of the present disclosure.

Referring to FIG. 7, this embodiment of the present disclosure provides a color changing method. The method may be applied to a terminal, where the terminal may include a shell, and may include a color changing unit that is attached to an inner side of the shell or attached to an outer side of the shell. Preferably, the terminal in Embodiment 3 and the terminal in Embodiment 1 may be a same terminal. A main process of the method may be as follows.

Step 701: Obtain a first color value.

In this embodiment of the present disclosure, the method may be applied to the terminal described in Embodiment 1, or may be applied to the color changing apparatus described in Embodiment 2.

Manners of obtaining the first color value may be different.

Optionally, the obtaining a first color value may be: receiving selection information of a user, and determining, according to the selection information, that the user selects a first color, a color value of the first color is the first color value.

It may be that the terminal obtains a first operation performed by the user, may respond to the first operation after obtaining the first operation and determine selection information corresponding to the first operation, and may determine, according to the selection information, that a color selected through the first operation performed by the user is the first color and that the color value of the first color is the first color value.

For example, the terminal may generate a selection interface. The selection interface may include at least one type of selectable color information. The color changing apparatus may include a displaying unit. The displaying unit may be instructed to display the selection interface, such that the user can select a wanted color on the selection interface after seeing the selection interface. For example, if the user selects the first color, a color finally presented by the color changing unit 103 is the first color.

Optionally, in this embodiment of the present disclosure, the obtaining a first color value may be: obtaining a first environment color, where the first environment color is a color of a surrounding environment of the terminal; and matching the first environment color with a stored color, and determining a first color whose degree of color matching with the first environment color is within a first preset threshold, a color value of the first color is the first color value, where the first preset threshold is used to indicate that the first environment color and the first color are adjacent colors or similar colors.

For example, the terminal may have a detecting unit. The detecting unit may be configured to acquire the first environment color by means of detection. For example, the detecting unit may be a sensor. After the detecting unit acquires the first environment color, the first environment color may be acquired using the detecting unit. The electronic device may internally store multiple colors. For example, the electronic device may have a storing unit that is configured to store multiple colors. After acquiring the first environment color, a processor 501 may match the first environment color with each stored color, and may determine one color whose degree of color matching with the first environment color is within the first preset threshold. For example, the color is the first color, and the color value of the first color is the first color value.

Step 702: Determine, according to a correspondence set of a color value and a voltage value, a first voltage value corresponding to the first color value.

The terminal may pre-store the correspondence set of the color value and the voltage value. If the first color value is obtained according to the selection information, after the first operation is obtained, the selection information corresponding to the first operation may be determined according to the first operation, thereby determining the first color selected according to the selection information and determining that the color value of the first color is the first color value. Therefore, the first color value may be searched for in the correspondence set. After the first color value is found, a voltage value corresponding to the first color value is also queried accordingly. For example, if the voltage value corresponding to the first color value is the first voltage value, the first voltage value may be provided for a color changing unit 103.

The terminal may pre-store the correspondence set of the color value and the voltage value. If the first color value is determined by obtaining the first environment color, after the first environment color is obtained, the first color whose degree of color matching with the first environment color is within the first preset threshold and that the color value of the first color is the first color value may be determined accordingly. Therefore, the first color value may be searched for in the correspondence set. After the first color value is found, a voltage value corresponding to the first color value is also queried accordingly. For example, if the voltage value corresponding to the first color value is the first voltage value, the first voltage value may be provided for a color changing unit 103.

Step 703: Provide the first voltage value for a color changing unit 103, such that a color value of the color changing unit 103 is changed from an initial color value to the first color value.

After it is determined that the voltage value corresponding to the first color value is the first voltage value, the first voltage value may be provided for the color changing unit 103. Therefore, the color changing unit 103 changes a color after receiving the first voltage value, where the color value of the color changing unit 103 is changed from the initial color value to the first color value. In this way, the first color value is finally presented for a shell 101 of the terminal, thereby achieving an effect wanted by the user.

If the terminal obtains the first color value by obtaining the selection information, for a user, the user only needs to select one color and may enable, only by one click, the shell 101 to turn to a color wanted by the user. The operation is very simple, the needs of the user can be better met, and the effect required by the user is achieved.

If the terminal determines the first color value by obtaining the first environment color, the terminal may collect the first environment color in real time, periodically, or after being triggered, so as to change the color of the shell 101. In this case, for a user, the user may not need to perform any operation, and the terminal may automatically change the color of the shell 101 according to an environment, such that the color of the shell 101 is better integrated with an environment color and a more harmonious displaying effect can be achieved.

The terminal in the embodiments of the present disclosure may include a shell 101, where a transparency value of the shell 101 is greater than a first preset transparency value, and the first preset transparency value is a transparency value that enables a user to see a color changing unit 103 located inside the shell 101; a power supplying unit 102, disposed inside the shell 101 and configured to supply power to the color changing unit 103; and the color changing unit 103, connected to the power supplying unit 102, attached to an inner side of the shell 101 or attached to an outer side of the shell 101, and configured to change a color when receiving electrical energy provided by the power supplying unit 102, where when receiving a first voltage value from the power supplying unit 102, the color changing unit 103 adjusts, according to a correspondence between a voltage value and a color, a current color value of the color changing unit 103 as a first color corresponding to the first voltage value.

In the embodiments of the present disclosure, the terminal may include the color changing unit 103. The color changing unit 103 itself can change a color according to different voltage values that are received. The transparency value of the shell 101 is greater than the first preset transparency value. Therefore, the color changing unit 103 is attached to the inner side of the shell 101 or the outer side of the shell 101, and when the color changing unit 103 changes the color, a color of the shell 101 is also changed accordingly. In this way, a color of the terminal can be changed without a need of adding an additional hardware shell to the terminal, which can effectively resolve a technical problem of a waste of materials due to production of a terminal shell in the prior art, can reduce manufacturing materials, and is conducive to environmental protection. For a user, a color of a terminal used by the user can be changed without a need of adding another hardware shell, which can not only implement personalization, but also reduce purchase costs of the user. In addition, the user does not need to manually replace a shell of the terminal, which also brings a great convenience to the user.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

To sum up, the foregoing embodiments are merely used to describe the technical solution of this application in detail. However, descriptions of the foregoing embodiments are merely used to help understand the method of the present disclosure and the core idea of the method, and shall not be understood as a limitation on the present disclosure. Any variation or replacement readily figured out by a person skilled in the art within the technical scope disclosed in the present disclosure shall fall within the protection scope of the present disclosure.

What is claimed is:

1. A terminal, comprising:
   a processor;
   a color changer coupled to the processor and comprising:
      a first transparent conducting layer;
      a first electrochromic layer coupled with the first transparent conducting layer;
      a first ion conducting layer coupled with the first electrochromic layer; and
      a first ion storage layer coupled with the first ion conducting layer;
   a shell comprising an interior and an exterior, the color changer being disposed in the interior of the shell, the first transparent conducting layer being coupled with an interior surface of the shell, and the shell being sufficiently transparent such that the color changer is visible through the exterior of the shell;
   a power supply disposed in the interior of the shell, the power supply being electrically connected to the color changer; and
   a sensor configured to detect an environment color from colors in a surrounding environment of the terminal, the processor being configured to:
      determine a first color whose degree of color matching with the environment color is within a preset threshold range such that a first hue angle of the first color and a second hue angle of the environment color are within the preset threshold range of fifteen degrees;
      determine a color value for the first color in a corresponding set of color values, each color value in the corresponding set of color values corresponding to a different voltage; and
      determine a voltage corresponding to the color value from the corresponding set of color values, the color of the terminal varying according to the voltage received by the color changer from the power supply.

2. The terminal according to claim 1, wherein the terminal further comprises a display disposed on the interior surface of the shell, the display being configured to display local data or data acquired from another electronic device.

3. The terminal according to claim 1, wherein the processor is disposed in the interior of the shell, the processor being further configured to:
receive the first color by receiving color selection information from a user; and
determine the voltage according to the color selection information.

4. The terminal according to claim 1, wherein the processor is disposed in the interior of the shell and coupled with the sensor, and the processor being further configured to:
match the environment color with a stored color in the corresponding set of color values;
determine the voltage according to the environment color; and
vary the first color of the terminal according to the voltage, the preset threshold range comprising an angle of a hue value.

5. A color changing method for a terminal, comprising:
detecting, with a processor, an environment color of a surrounding environment of the terminal;
determining, with the processor, a first color whose degree of color matching with the environment color is within a preset threshold range such that a first hue angle of the first color and a second hue angle of the environment color are within the preset threshold range of fifteen degrees;
obtaining, with the processor, a first color value from the first color from a corresponding set of color values, each color value in the corresponding set of color values corresponding to a different voltage value;
determining, with the processor, a first voltage value corresponding to the first color value from the corresponding set of color values;
providing, with the processor, the first voltage value for a color changer, the color changer comprising:
a transparent conducting layer;
an electrochromic layer coupled with the transparent conducting layer;
an ion conducting layer coupled with the electrochromic layer; and
an ion storage layer coupled with the ion conducting layer; and
changing, with the processor, the color of the terminal by applying the first voltage value to the color changer.

6. The method according to claim 5, wherein obtaining the first color value comprises receiving selection information from a user interface of the terminal.

7. The method according to claim 5, further comprising setting the first color value according to the environment color.

8. A color changing apparatus, comprising:
a color changer comprising:
a transparent conducting layer;
an electrochromic layer coupled with the transparent conducting layer;
an ion conducting layer coupled with the electrochromic layer; and
an ion storage layer coupled with the ion conducting layer;
a shell comprising an interior side and an exterior side, the interior side being coupled with the transparent conducting layer;
a processor configured to:
obtain a first color value associated with a color from a corresponding set of color values, each color value in the corresponding set of color values corresponding to a different voltage value, the color comprising a first color whose degree of color matching with an environment color is within a preset threshold range such that a first hue angle of the first color and a second hue angle of the environment color are within the preset threshold range of fifteen degrees; and
determine a first voltage value corresponding to the first color value in the corresponding set of color values; and
a power supply configured to provide the first voltage value to the color changer according to an instruction of the processor, the color changer being configured to adjust a current color value of the color changer to the first color value corresponding to the first voltage value when receiving the first voltage value.

9. The apparatus according to claim 8, wherein the processor is further configured to receive the first color value from a user interface.

10. The apparatus according to claim 8, further comprising a sensor configured to detect an environment color of a surrounding environment of a terminal comprising the color changer, the processor being further configured to receive the first color as the environment color detected by a sensor.

11. The terminal according to claim 1, wherein the color changer further comprises a metal layer coupled with the first ion storage layer, the first color of the terminal further varying according to a color of the metal layer.

12. The terminal according to claim 1, wherein the color changer further comprises a second color changer, comprising:
a second transparent conducting layer;
a second electrochromic layer coupled with the second transparent conducting layer;
a second ion conducting layer coupled with the second electrochromic layer; and
a second ion storage layer coupled with the second ion conducting layer, the first color of the terminal further varying according to a second voltage received by the color changer from the power supply.

13. The terminal according to claim 12, wherein the second color changer further comprises a metal layer coupled with the second ion storage layer, the first color of the terminal further varying according to a color of the metal layer.

14. The terminal according to claim 1, wherein the shell further comprises a top portion that is configured to be selectively connected to a bottom portion in a stacked configuration, the interior surface of the shell to which the first transparent conducting layer is coupled being an interior surface of the top portion of the shell, the terminal further comprising a second color changer disposed in the interior of the shell, and the second color changer comprising:
a second transparent conducting layer;
a second electrochromic layer coupled with the second transparent conducting layer;
a second ion conducting layer coupled with the second electrochromic layer; and
a second ion storage layer coupled with the second ion conducting layer, the second transparent conducting layer being coupled with an interior surface of the bottom portion of the shell, and the power supply being electrically coupled to the second color changer.

15. The method according to claim 7, wherein setting the color value according to the environment color comprises matching the environment color with a stored color.

16. The apparatus according to claim 10, wherein the processor is further configured to match the environment color with a stored color.

* * * * *